(12) United States Patent
Bierer et al.

(10) Patent No.: US 8,029,819 B2
(45) Date of Patent: Oct. 4, 2011

(54) WEIGHT MANAGEMENT SYSTEM FOR OBESE ANIMALS

(75) Inventors: Tiffany L. Bierer, Fullerton, CA (US); Claudia Chow, Verden (DE); Linh M. Bui, Roosmoor, CA (US); Michael J. Wilson, Roosmoor, CA (US)

(73) Assignee: Mars Incorporated, McLean, VA (US)

( * ) Notice: Subject to any disclaimer, the term of this patent is extended or adjusted under 35 U.S.C. 154(b) by 1533 days.

(21) Appl. No.: 10/264,886

(22) Filed: Oct. 4, 2002

(65) Prior Publication Data

US 2003/0138548 A1   Jul. 24, 2003

Related U.S. Application Data

(63) Continuation-in-part of application No. 10/054,093, filed on Jan. 22, 2002, now abandoned.

(51) Int. Cl.
*A23K 1/165* (2006.01)

(52) U.S. Cl. ........................................ 424/442; 426/630

(58) Field of Classification Search .................. 424/442
See application file for complete search history.

(56) References Cited

U.S. PATENT DOCUMENTS

| | | | |
|---|---|---|---|
| 3,810,994 A | 5/1974 | Wiegand | |
| 4,009,265 A | 2/1977 | Howard et al. | |
| 4,737,364 A | 4/1988 | Kalogris | |
| 4,892,748 A | 1/1990 | Andersen et al. | |
| 5,141,755 A | 8/1992 | Weisman | |
| 5,431,927 A * | 7/1995 | Hand et al. ........................ | 426/2 |
| 5,554,646 A * | 9/1996 | Cook et al. .................... | 514/560 |
| 5,760,082 A | 6/1998 | Cook et al. | |
| 5,776,913 A | 7/1998 | Ogilvie et al. | |
| 5,855,917 A | 1/1999 | Cook et al. | |
| 5,962,043 A | 10/1999 | Jones et al. | |
| 6,015,833 A | 1/2000 | Sæbø et al. | |
| 6,020,378 A | 2/2000 | Cook et al. | |
| 6,039,952 A | 3/2000 | Sunvold et al. | |
| 6,042,869 A * | 3/2000 | Remmereit .................. | 426/630 |
| 6,060,514 A | 5/2000 | Jerome et al. | |
| 6,071,544 A | 6/2000 | Sunvold | |
| 6,204,291 B1 | 3/2001 | Sunvold et al. | |
| 6,214,372 B1 | 4/2001 | Jerome et al. | |
| 6,225,486 B1 | 5/2001 | Saebo et al. | |
| 6,242,621 B1 | 6/2001 | Jerome et al. | |
| 6,306,442 B1 | 10/2001 | Sunvold et al. | |
| 6,333,353 B2 | 12/2001 | Saebo et al. | |
| 6,380,409 B1 | 4/2002 | Saebo et al. | |
| 6,395,782 B1 | 5/2002 | Cook et al. | |
| 6,410,063 B1 | 6/2002 | Jewell et al. | |
| 6,410,761 B1 | 6/2002 | Saebo et al. | |

FOREIGN PATENT DOCUMENTS

| | | |
|---|---|---|
| CA | 2071345 A1 | 12/1992 |
| CA | 2342218 A1 | 3/2000 |
| CA | 2377676 A1 | 1/2001 |
| EP | 0 646 325 A1 | 4/1995 |
| EP | 0965278 A1 | 12/1999 |
| GB | 2 355 382 | 4/2001 |
| WO | WO-00/00039 | 1/2000 |
| WO | WO-0051443 A1 | 9/2000 |
| WO | WO-0191575 | 12/2001 |
| WO | WO-02/56702 | 1/2002 |

OTHER PUBLICATIONS

Cunningham. Archer Daniels Midland forms joint venture to produce fat-fighting oil. Archer Daniel Midland Company: News Release (Jun. 13, 2001).*
Park et al. Evidence that the trans-10, cis-12 isomer of conjugated linoleic acid induces body composition changes in mice. Lipids. (1999) vol. 34, No. 3, pp. 235-241.*
Hannah et al (Increased dietary protein spares lean body mass during weight loss in dogs. Journal of Veterinary Internal Medicine. 1998:12. p. 224).*
Blanchard, "Dietary L-Camitine Supplementation in Obese Cats Alters Camitine Metabolism and Decreases Ketosis during Fasting and Induced Hepatic Lipidosis," *Journal of Nutrition*,, 132(2): 204-210, 2002.
Resnick, "Effects of feeding a high-protein diet and an all-meat diet on the hemogram of the dog," *Veterinary Medicine and Small Animal Clinician*, 69(1): 70, 72-74, 1974.
Office Action issued for Japanese Patent Application No. 2002-222983, dated Mar. 13, 2007, with English Language translation.
Dipiro et al., "Pharmacotherapy : A Pathophysiologic Approach", 4th edition, Appleton & Lange, Inc. 1999, 688-689.
Hannah et al., "Increased dietary protein spares lean body mass during weight loss in dogs", 1998, J. Vet. Int. Med., 224, vol. 12.
Lakey et al., "Dietary lipid content influences the clinical and intestinal adaptive responses to islet transplantation in diabetic rats", Diabetes-Res., 1992, 149-64, vol. 19(4).
Nobels, F., et al.; Weight reduction with a high protein, low carbohydrate, calorie-restricted diet: effects on blood pressure, glucose and insulin levels; Netherlands Journal of Medicine 35:295-302, 1989.

* cited by examiner

*Primary Examiner* — Jake M. Vu
(74) *Attorney, Agent, or Firm* — Fulbright & Jaworski L.L.P.

(57) ABSTRACT

A diet system for promoting comprehensive weight management in companion animals. The diet system includes a stage I pet food product for promoting weight loss and building lean body mass and a stage II pet food product for maintaining the weight loss and the lean body mass.

13 Claims, 3 Drawing Sheets

WEIGHT MANAGEMENT SYSTEM FOR OBESE ANIMALS

RELATED APPLICATION

This application is a continuation-in-part of and claims priority to U.S. application Ser. No. 10/054,093, filed on Jan. 22, 2002.

BACKGROUND OF THE INVENTION

1. Field of the Invention

The invention generally relates to a pet food for use in a comprehensive weight management system for companion animals. More particularly, the weight management system includes two stages: a weight loss stage (stage I) and a weight maintenance stage (stage II). Stage I involves a pet food comprising a high protein, low calorie daily diet that includes a functional ingredient, which further modulates metabolism and builds lean body mass in companion animals. Stage II involves a pet food comprising a low calorie daily diet that maintains the leaner weight of the animal and improves health for the life of the animal.

2. Related Art

In westernized societies the most prevalent form of malnutrition in humans is over-consumption of calories resulting in excess body fat. Studies have shown that greater than 20-30% of dog and cat populations are overweight or obese (over-fat). Obesity in domesticated dogs and cats has been linked to the development of numerous diseases including renal failure, diabetes, and arthritis. Overweight dogs have an increased risk of developing transitional cell carcinoma of the bladder. Further, it is well established that obesity is a predisposing factor to idiopathic hepatic lipidosis in cats, however, their inability to convert dietary C18 essential fatty acids into long chain fatty acids creates a need for dietary consumption of 20 carbon long chain fatty acids. Such a dietary requirement leaves cats extremely vulnerable to weight disorders and weight-associated diseases such as diabetes (Appleton et al., 2000).

Obesity generally is considered present when body weight of the companion pet is 15% or more greater than optimum, which is the point at which health problems begin increasing with increasing weight. Generally speaking, the incidence of obesity in domestic animals increases with age. Similar to humans, as a dog ages, body fat increases, and lean body mass decreases. However, obesity commonly goes unnoticed by the animal's owner and, thus, poses a life-threatening problem to domesticated animals.

Some pet food compositions formulated to prevent or treat obesity in animals have been described. U.S. Pat. No. 6,071,544 teaches that a specific combination of long chain conjugated fatty acids (0.2 to 1.5 weight % of dry matter) together with up to 50% protein promotes weight loss in cats. A diet greater than about 16% by weight of animal-based protein is taught to reduce body fat in geriatric dogs (WO 00/51443). However, U.S. Pat. No. 5,141,755 teaches that non-meat based animal fats in a high protein, high farinaceous diet provides an ovo or lacto-ovo nutritionally balanced pet food product. U.S. Pat. No. 4,892,748 describes a low calorie dog treat that is comprised primarily of cellulose, a β-1,4-glucan that affords no nutritional value to the animal.

Further, a pet food composition that improves several clinical indications (i.e., BUN, creatinine, phosphorous, $CO_2$ and triglyceride levels) in animals with renal disease is described in U.S. Pat. No. 6,039,952 and U.S. Pat. No. 6,306,442. This pet food includes from about 10 to about 32% crude protein, from about 8 to about 20% fat, from about 3 to about 25% total dietary fiber, and fermentable fibers which have an organic matter disappearance of 15 to 60% when fermented by fecal bacteria for a 24 hour period, the fibers being present in amounts from about 1 to 11 weight percent of supplemental total dietary fiber. The composition is taught to provide adequate protein, has low phosphorus levels, improves metabolic buffering, and lowers blood triglyceride levels in the animal.

Similarly, diets disclosed for the treatment of human obesity have included compositions such as a concentrate that consists entirely of non-animal natural components, a lack of simple sugars and a flour comprising of at least 50% protein, of less than 15% carbohydrates and of 35 to 50% plant fiber for use in the preparation of foods such as bakery products (U.S. Pat. No. 4,737,364; EP 965278 A1). Such diets are not completely without credence because hypertension, and, thus, risk of developing cardiovascular disease, in obese patients has been linked to disturbances in carbohydrate metabolism (Nobels et al., 1989).

However, low calorie diets comprising increased ratios of amino acids to carbohydrates, such as the diet taught in U.S. Pat. No. 4,009,265, cause increased blood urea nitrogen (BUN) concentrations. Urea is a by-product of protein or amino acid catabolism and thus is directly related to the amount of protein in a diet. The kidneys function to remove urea from the plasma, and in this regard high protein diets place an unusual burden on the kidneys which can lead to severe consequences over time including the development of azotemia or uremia.

Also symptomatic of high protein diets is the potential to induce ketosis, a condition that is shared in humans and dogs. Ketosis is a pathological condition in which the brain consumes ketone bodies as its major fuel source and is a diagnostic for diabetes mellitus. For example, urine abnormally high in ketone bodies is expected after a prolonged fast. However, this metabolic shift is undesirable and also leads to severe renal damage if experienced over long periods of time.

Natural products derived from plants and food are frequently employed as effective drugs, and in recent years there has been an increased interest in the analysis of these natural products, especially where a clinical benefit is claimed. For this reason, functional ingredients which include secondary metabolites of plant and animal origin, are often added to foods in order to effect a desired metabolic response. For example, EP 646325A1 describes a pet food comprised of at least 30% by weight of indigestible dextrin that demonstrates obese-improving effects by controlling blood-sugar levels and insulin secretion in dogs and cats.

Several patents to the Wisconsin Alumni Research Foundation describe the use of certain prepared conjugated linoleic acid (CLA) isomers, namely 9-cis, 11-trans CLA and 10-trans, 12-cis CLA, to alter body fat levels and lean body masses without a effect on body weight (U.S. Pat. No. 6,020,378; U.S. Pat. No. 5,760,082; U.S. Pat. No. 5,554,646; and U.S. Pat. No. 5,855,917). In fact, U.S. Pat. No. 5,428,072 describes that incorporation of CLA into animal feed increased efficiency of feed conversion leading to a greater weight gain in the CLA supplemented animals. Further, these same CLA isomers, denoted therein as c9,t11 and t10,c12, are taught in several patents owned by Conlinco Inc., as the biologically active isomers of CLA and synthetic preparation methods that allow for the enrichment of the t10,c12 linoleic acid isomer and uses thereof are described (U.S. Pat. No. 6,410,761; U.S. Pat. No. 6,333,353; U.S. Pat. No. 6,015,833;

U.S. Pat. No. 6,380,409; U.S. Pat. No. 6,214,372; U.S. Pat. No. 6,060,514; U.S. Pat. No. 6,242,621; U.S. Pat. No. 6,225,486).

U.S. Pat. No. 5,962,043 teaches jojoba seed meal as a nutritional supplement in animal feed, particularly for companion dogs, to promote weight loss. Simmondsin served as the active or functional ingredient in the feed that, based on previous research, results in an associated reduction in food intake and retardation of growth. These formulations include high fat and high caloric density to ensure palatability.

U.S. Pat. No. 6,204,291 teaches dietary supplementation with L-carnitine, a naturally occurring acid also known as β-Hydroxy-γ-trimethylaminobutyrate, in dog food to promote weight loss. Carnitine is found in the body and is enzymatically combined with fatty acids to facilitate their transportation through mitochondrial membranes, thus aiding in fatty acid metabolism (Yalkowsky, S. H., 1970). Oral administration of L-carnitine for obesity in mammals has been described in U.S. Pat. No. 3,810,994. It also has been implicated in improvements in myocardial contractility and systolic rhythm in congestive heart failure, it has been administered in cases of cardiac arrythmia (U.S. Pat. No. 3,830,931 and U.S. Pat. No. 3,968,241), and for increasing high density lipoproteins levels (U.S. Pat. No. 4,255,449).

Prior to the present invention, diet solutions have not provided a comprehensive approach in addressing the issues of weight management. Most diets simply lower caloric density, increase total carbohydrates by increasing fiber, which leads to reduced palatability, thereby creating a diet that leaves the animal hungry and, sometimes, induces lean body (i.e., muscle) loss.

The present invention provides a long-sought after comprehensive weight management system for companion animals, particularly obese animals, for treating and preventing obesity through dietary intervention. The present invention also increases and maintains the lean body mass of companion animals as well as enhances satiety, decreases voluntary food intake, decreases BUN levels and reduces the risk of ketosis in the animal.

SUMMARY OF THE INVENTION

The present invention provides a comprehensive weight management system to help optimize the body composition of a domestic animal through dietary intervention by providing daily diets for the animal.

In an object of the present invention, the dietary intervention involves a first stage that promotes weight loss and an increase in lean body mass by providing a pet food product comprising, on a dry matter basis, about 35% to about 70% by weight of a protein, about 4% to about 10% by weight of a fat, about 2% to about 25% by weight of a fiber, about 10% to about 35% by weight of a carbohydrate, and about 0.1% to about 2% by weight of a functional ingredient.

In another object of the present invention, the dietary intervention involves a second stage that maintains the weight loss and the increase in lean body mass by providing a pet food product comprising, on a dry matter basis, about 20% to about 35% by weight of a protein, about 4% to about 10% by weight of a fat, about 2% to about 25% by weight of a fiber, about 25% to about 70% by weight of a carbohydrate, and about 0.1% to about 2% by weight of a functional ingredient.

An additional object of the invention is a process for producing a pet food product that provides comprehensive weight management in companion animals by adding, on a dry matter basis, about 35% to about 70% by weight of a protein, about 4% to about 10% by weight of a fat, about 2% to about 25% by weight of a fiber, about 10% to about 35% by weight of a carbohydrate, and about 0.1% to about 2% by weight of a functional ingredient.

Another object of the present invention is a process for producing a pet food product that provides comprehensive weight management in companion animals by adding, on a dry matter basis, about 20% to about 35% by weight of a protein, about 4% to about 10% by weight of a fat, about 2% to about 25% by weight of a fiber, about 25% to about 70% by weight of a carbohydrate, and about 0.1% to about 2% by weight of a functional ingredient.

A further object of the present invention is a process of feeding companion animals a pet food product that provides comprehensive weight management. The animal is fed the pet food product for a time sufficient to promote comprehensive weight management (i.e., weight loss) in the animal comprising, on a dry matter basis, about 35% to about 70% by weight of a protein, about 4% to about 10% by weight of a fat, about 2% to about 25% by weight of a fiber, about 10% to about 35% by weight of a carbohydrate, and about 0.1% to about 2% by weight of a functional ingredient.

An additional object of the present invention is a process of feeding companion animals a pet food product that provides comprehensive weight management comprising feeding the animal a pet food product to maintain the comprehensive weight management comprising, on a dry matter basis, about 20% to about 35% by weight of a protein, about 4% to about 10% by weight of a fat, about 2% to about 25% by weight of a fiber, about 25% to about 70% by weight of a carbohydrate, and about 0.1% to about 2% by weight of a functional ingredient.

Certain objects of the present invention provide a process of feeding companion animals a pet food product of the present invention to increase the lean body mass of companion animals, to enhance satiety, to decrease voluntary food intake and to mitigate potential adverse medical risks associated with high protein diets.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF SUMMARY OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE INVENTION

Definitions

Figure 1:
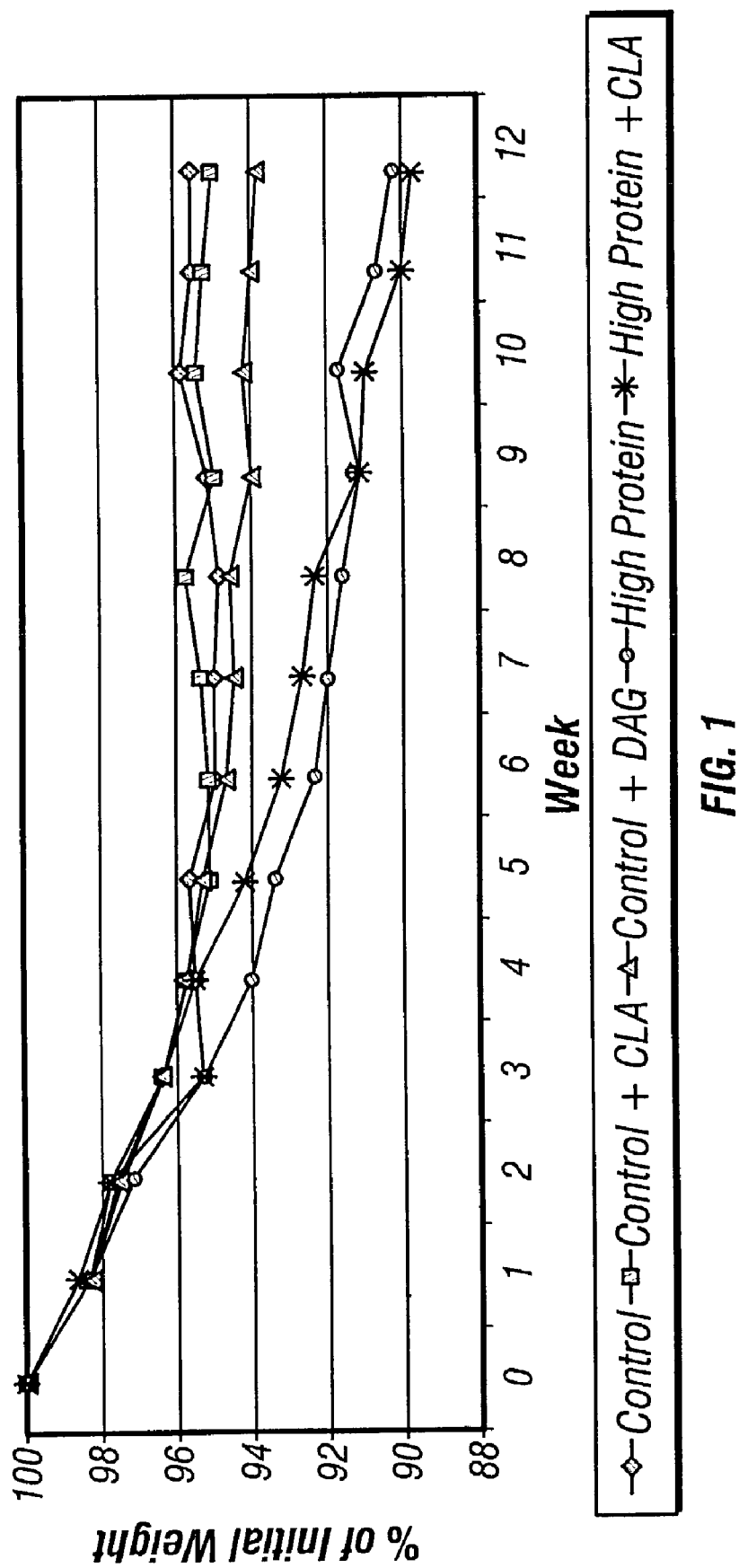
FIG. 1 is a chart illustrating comparative percent body weight changes over time in dogs consuming the inventive diets versus control diets.

The term "functional ingredient" as used herein refers to a compound, naturally occurring or synthetic, that is included in a composition and effects a preventative and/or therapeutic response by modulating metabolism in a manner found to be specific to the compound. It is understood that the functional ingredient may include a fat, a carbohydrate, a vitamin, a secondary metabolite, a protein, a prebiotic, a probiotic, or the like, provided the ingredient serves a desired function after consumed by the recipient animal. In a preferred embodiment, the function of the functional ingredient in the subject composition comprises a mitigation of the effect of a high protein diet on the renal system (i.e., kidneys) of the recipient. In other words, the functional ingredient preferably acts to alleviate stress, induced by high protein diets, on the renal system.

A diacylglyceride is a lipid structurally characterized by a glycerol (a three carbon alcohol) backbone, two fatty acid chains and a phosphate group. By definition, a 1,2-diacylglyceride comprises fatty acid chains located at carbons 1 and 2 and, further, are characterized by a long hydrocarbon molecule such as unsaturated, saturated and conjugated hydrocarbons. 1,2-diacylglyceride is a precursor to phosphatidylcholine, phosphatidylethanolamine and phosphatidylinositol, which are indispensable components of biological membranes. In addition, 1,2-diacylglycerides are precursors to triglyceride biosynthesis and, therefore, are central to energy stores of organisms. However, 1,3-diacylglycerides are not metabolized to triglyceride and, thus, are not deposited as fat, but rather, they are burned as energy. A 1,3-diacylglyceride differs structurally from a 1,2-diacylglyceride by having an acyl group at C-3 of the glycerol backbone rather than at C-2. Clinical investigations of obesity have included dietary consumption of diacylglycerol and indicated that diacylglycerol lowers serum triglyceride and cholesterol levels (Takasaka et al., 2000) and decreases body weight and regional fat deposition (Nagao et al., 2000). Rich natural sources of 1,3-diacylglycerides are vegetable oils, such as Econa oil, however, a synthetic 1,3-diacylglyceride is also contemplated. As used herein, the terms "diacylglycerol" and, interchangeably, "DAG" and/or "diacylglyceride" refer to a 1,3-diacylglycerol molecule, unless otherwise noted.

A compound, component or composition is said to be "acceptable" if its administration can be tolerated by a recipient mammal. Such a component is said to be administered in an "effective amount" or "for a time sufficient" if the amount administered is physiologically significant and/or the time the component is administered is physiologically significant. By "physiologically significant," it is meant that a technical change in the physiology of a recipient mammal is observed. For example, in weight management of companion animals, an agent which slows, hinders, delays, completely treats the disease and/or symptoms of obesity, is considered effective. Alternatively, the composition that is administered for a time that slows, hinders, delays, completely treats the disease and/or symptoms of obesity, is considered sufficient.

By body composition, it is meant the total quality of lean, fat and bone in the body. By improved body composition, it is meant that the animal exhibits a greater percentage of lean tissue and a lower percentage of body fat.

Current weight loss diets for dogs rely on severe calorie restrictions and caloric dilution for effectiveness. The present invention discloses a diet system for promoting and for maintaining weight loss in companion animals, i.e., obese dogs, without utilizing severe calorie restriction or caloric dilution. The present invention is directed to a weight management system for domestic animals that provides for the optimization of an animal's body composition through dietary intervention, including a pet food product and a process for producing the pet food product that provides for a comprehensive weight management system. The system includes two stages: stage I and stage II. Stage I is directed to promoting weight loss, as described in co-pending U.S. patent application Ser. No. 10/054,093, herein incorporated by reference in its entirety, and stage II is directed to maintaining the weight loss. For example, feeding the comprehensive weight management system of the present invention to an animal effects a weight loss of about 12% in 12 weeks in the animal. Because the amount of weight lost depends on several factors, such as physiology and exercise habits of the animal, the weight loss achieved may be in the range of about 2% to about 15% or higher.

Although it is preferred that the weight management system used by the pet owner include both stage I and stage II, the single use of either product for its intended purpose is within the scope of the present invention. For example, an animal that has experienced a recent loss of weight may be fed the stage II pet food product for maintaining the weight loss, i.e., weight maintenance. Alternatively, an animal that is in need of weight management is fed the stage I pet food product to promote weight loss, to increase lean body mass, to increase the animal's satiety, to decrease the animal's voluntary food intake, to decrease the animal's BUN levels and/or BUN/creatinine ratio levels or to reduce the risk of ketosis, and ultimately renal damage, to the animal. However, after the desired weight loss is achieved, in certain embodiments, the animal's diet may then comprise foodstuffs and/or food products that are different from the stage II product.

The pet food product of stage I generally includes, on a dry matter basis, about 35% to about 70% by weight of a protein, about 4% to about 10% by weight of a fat, about 2% to about 25% by weight of a fiber, about 10% to about 35% by weight of a carbohydrate, and about 0.1% to about 2% by weight of a functional ingredient. The pet food product of stage II generally includes, on a dry matter basis, about 20% to about 35% by weight of a protein, about 4% to about 10% by weight of a fat, about 2% to about 25% by weight of a fiber, about 25% to about 70% by weight of a carbohydrate, and about 0.1% to about 2% by weight of a functional ingredient.

Although it is preferred that the pet food product of stage I and/or stage II be nutritionally complete, a non-nutritionally complete pet food product may also be included in the present invention. For example, either the pet food product of stage I is nutritionally complete and the pet food product of stage II is non-nutritionally complete or the pet food product of stage I is non-nutritionally complete and the pet food product of stage II is nutritionally complete. Yet further, both pet food products of stage I and stage II may be non-nutritionally complete.

Generally, the caloric density of the stage I pet food is about 295 to about 375 kcal per 100 grams of pet food. In a preferred embodiment, the pet food product of the present invention comprises a caloric density of between about 315 and about 330 kcal per 100 grams of pet food.

Feeding the comprehensive weight management system of the subject invention to companion animals, such as to a dog and/or to a cat, and alternatively to obese dogs and/or cats, will help optimize the body composition of the domestic animal by modulating metabolism and building lean body mass. Feeding companion animals the pet food of the subject invention will also enhance satiety and decrease voluntary food intake of the companion animal. Further, feeding companion animals the pet food of the subject invention will decrease blood urea nitrogen levels (BUN) and blood urea nitrogen (BUN)/creatinine ratio levels, thereby reducing the risk of renal damage to the animal. Further, the risk of the animal developing ketosis is decreased by consuming the pet food product of the present invention.

As is known to one skilled in the art, there are a variety of commonly known pet food products. In the area of cat and dog food, there is wet pet food, semi-moist pet food, dry pet food and pet treats and snacks. Drinks for pets are also available such as milk drinks for cats. Wet pet food generally has a moisture content above about 65%. Semi-moist pet food typically has a moisture content between about 20 to about 65% and can include humectants such as propylene glycol, potassium sorbate, and other ingredients to prevent microbial (i.e., bacteria and mold) growth. Dry pet food (kibble) generally has a moisture content below about 20%, and its processing typically includes extruding, drying and/or baking in heat. Pet treats and snacks can typically be semi-moist chewable treats or snacks; dry treats or snacks in any number of shapes and/or forms; chewable bones; baked, extruded or stamped treats; confection treats/snacks; or other kinds of treats as is known to one skilled in the art. The pet food product may include many different shapes. For example, each shape may comprise the ingredients of the subject composition or, alternatively, a combination of two or more shapes, each having a specific recipe that is cumulative in providing intake of the total composition of the present invention, is contemplated. In a specific example, the stage II pet food product comprises a plurality of kibbles that are characterized by having a shape of either a pea, a bone or a carrot, and each of the shapes comprise a specific recipe. Feeding the pet the combination of one of each shape may provide the composition of the stage II pet food. Alternatively, each shape provides the composition of the stage II pet food and, thus, consumption of any of the shapes provides the animal with comprehensive weight management.

A semi-moist pet food product generally includes ingredients such as cereal grains, meats, fats, vitamins, minerals, water and functional ingredients that are blended together, cooked and packaged. However, any semi-moist pet food formulation known to one skilled in the art can be used. For example, a pet food of stage I can be formed by adding, on a dry matter basis, about 35% to about 70% by weight of a protein, about 4% to about 10% by weight of a fat, about 2% to about 25% by weight of a fiber, about 10% to about 35% by weight of a carbohydrate, and about 0.1% to about 2% by weight of a functional ingredient. Alternatively, the stage I pet food can be formed by making a first mixture, on a dry matter basis, about 35% to about 70% by weight of a protein, about 4% to about 10% by weight of a fat, about 2% to about 25% by weight of a fiber, and about 10% to about 35% by weight of a carbohydrate. The functional ingredient is then added to the first mixture to provide about 0.1 to about 2% of the functional ingredient. Other variations of adding or mixing the ingredients are contemplated and considered within the scope of routine experimentation and processing, and determining such methods as are suitable is within the skill of the ordinary artisan in the art. Further, these methods are contemplated for the preparation of the stage II pet food product.

In an example of a dry pet food, the ingredients generally include cereal grains, meats, poultry, fats, vitamins, minerals and other functional ingredients. The components are mixed and put through an extruder/cooker. Thereafter, the product is cut or shaped and dried. Non-limiting examples of shapes include a kibble, a pea, a bone, a carrot, a chunk and a pocket. After drying, flavors, fats and other functional ingredients can be coated or sprayed onto the dried product. The spray used is of a kind that is known to one skilled in the art of producing dry pet food.

In an alternative embodiment, an ingredient is specific to a specific shape. For example, if the shape is a carrot, the ingredients may include a carrot powder. Alternatively, if the shape is a pea, the ingredients may include a coloring agent and/or a plant concentrate, such as alfalfa or the like to provide an aesthetic quality.

Although a composition and process for producing a semi-moist pet food product and a dry pet food product has been generally described above, it should be appreciated that any semi-moist pet food composition and process or dry pet food composition and process known to one skilled in the art can be used to produce the pet food product of the subject invention.

A wet pet food and pet treats/snacks are produced as is known to one skilled in the art depending upon the kind of wet pet food product and treat or snack desired. The procedure for preparing the pet food of the present invention depends upon the type of processing required to manufacture the wet pet food or treat/snack. For example, in semi-moist treats/snacks, in which the processing temperature usually does not exceed 5 to 70 degrees C., some or all of the components are added to the treat during processing. However, if the processing temperature of the treat generally exceeds 70 degrees C. and a component such as a functional ingredient displays temperature sensitivity, then the temperature-sensitive component is coated on the finished product.

In specific embodiments, the fat can be provided by a fat that comprises an essential long-chain fatty acid, such as a tetraenoic acid. This is particularly desirable in a pet food product for cats. Functional ingredients that modulate metabolism and build lean body mass include, for example, L-carnitine, conjugated linoleic acid and a diacylglyceride, preferably include conjugated linoleic acid and diacylglyceride, and more preferably include a diacylglyceride and conjugated linoleic acid. Generally, with respect to the stage I pet food product, the functional ingredient acts to promote weight management and/or mitigate adverse effects of high protein diets. A natural or a synthetic functional ingredient is contemplated. A non-limiting example of a natural source of a functional ingredient is a vegetable oil, which includes, but is not limited to, Econa, cottonseed, corn, peanut, sunflower, safflower, olive, palm (i.e., coconut and babasu), sesame, soybean, rapeseed, flaxseed, wheat germ, hempseed and perilla oils. In a specific embodiment, the diacylglyceride is obtained from a vegetable oil having a diacylglyceride content of about 1% to about 85%. In a preferred specific embodiment, the diacylglyceride is obtained from a vegetable oil having at least about 5% diacylglyceride content. Synthetic and semi-synthetic (i.e., isomerization of vegetable oil using, for example, rumen bacterium *Butyrivibrio fibrisolvens*) preparations of conjugated linoleic acid have been described and are considered suitable for the present invention (see, for example, U.S. Pat. No. 6,410,761; U.S. Pat. No. 6,380,409; and U.S. Pat. No. 5,554,646, each of which is herein incorporated by reference in their entirety). In such embodiments that the functional ingredient is a diacylglyceride or a conjugated linoleic acid, the amount may be calculated as part of either the functional ingredient content, or of the fat content.

It is also contemplated that any of the ingredients of the stage I pet food product may also be used in the stage II pet food product. For example, if sunflower oil is used as a source of fat in the stage I product, then sunflower oil may also be used as a source of fat in the stage II product. Alternatively, a different source of a fat may be used in either or both of the inventive products.

A skilled artisan is aware that a pet food product may further comprise vitamins, trace minerals, enzymes, including those used as processing aids, and flavorings, and is preferred to provide the animal with an entire daily diet to manage obesity and promote healthy living.

One of ordinary skill in the art is further aware that the amount of total ash included in the nutrient data is an estimate of the total mineral content in the food product and is determined using methods well-known in the art. As is well-known in the art, determining the amount of ash in a food is often necessary in order to calculate the amount of total carbohydrate in a proximate analysis scheme of the food.

A process for producing the stage I pet food of the subject invention includes the step of preparing a first mixture by adding about 35% to about 70% of a protein, about 4% to about 10% of a fat, about 2% to about 25% of a fiber, about 10% to about 35% carbohydrate. The first mixture is then combined with about 0.1% to about 2% of a functional ingredient to provide a weight management system in which the functional ingredient modulates metabolism and builds lean body mass. Alternatively, each ingredient (i.e., the protein, fat, fiber, digestible carbohydrate, ash and/or functional ingredient) can be processed as one mixture. Other variations of adding or mixing the ingredients are contemplated and considered within the scope of routine experimentation and processing and determining such methods as are suitable is within the skill of the ordinary artisan in the art. These methods are also contemplated in the preparation of the stage II pet food product.

The process of feeding a companion animal the stage I pet food product of the present invention will promote comprehensive weight management in the companion animal, by promoting weight loss, by increasing the animal's lean body mass, by enhancing the satiety and decreasing voluntary food intake of the animal, by decreasing blood urea nitrogen levels in the animal and reducing the risk of ketosis in the animal. The process of feeding the companion animal the stage II pet food product of the present invention will promote comprehensive weight management in the companion by maintaining the weight loss, the increase in lean body mass, the enhanced satiety, the decreased voluntary food intake, the decreased blood urea nitrogen levels, the reduced risk of ketosis and/or the reduced risk of renal damage of the animal.

Thus, as described herein, the present invention provides a comprehensive approach to help optimize the body composition of a domestic animal. The invention targets (i) an induction in adipose (fat) metabolism, (ii) a minimization of muscle wasting that can occur from low protein, calorie-restricted diets, (iii) an increase in satiety and maintenance of palatability to reduce behavioral changes (i.e., begging) which lead to increased caloric consumption and non-compliance to a caloric restricted diet, and (iv) maintenance of these factors for the life of the animal. This system reduces the total energy delivery, induces an increase in fat metabolism, and thus, leaves the pet satiated. This system also reduces the risk of renal damage that is associated with high protein diets by decreasing BUN levels and BUN/creatinine ratio levels in the animal.

EXAMPLE

Five test diets (n=10 obese dogs/diet) were tested for a 12 week period. The five diets included: (1) Control (28% protein); (2) Control+Conjugated Linoleic Acid (CLA); (3) Control+diacylglycerides (DAG); (4) High protein (50% protein); and (5) High protein+CLA. Dogs were fed at a slight caloric restriction (15% caloric restriction based on baseline caloric intake) to encourage weight loss. Lean body mass was determined by isotope ratio mass spectrometry (IRMS) in deuterium oxide ($D_2O$), and the fat mass was calculated by subtracting the lean body mass from body weight.

As illustrated in the chart of FIG. 1, the results showed a significantly greater weight loss in the dogs fed the high protein diets as compared to the control diet and the other test compound diets, with or without the functional ingredient, CLA.

Figure 2:
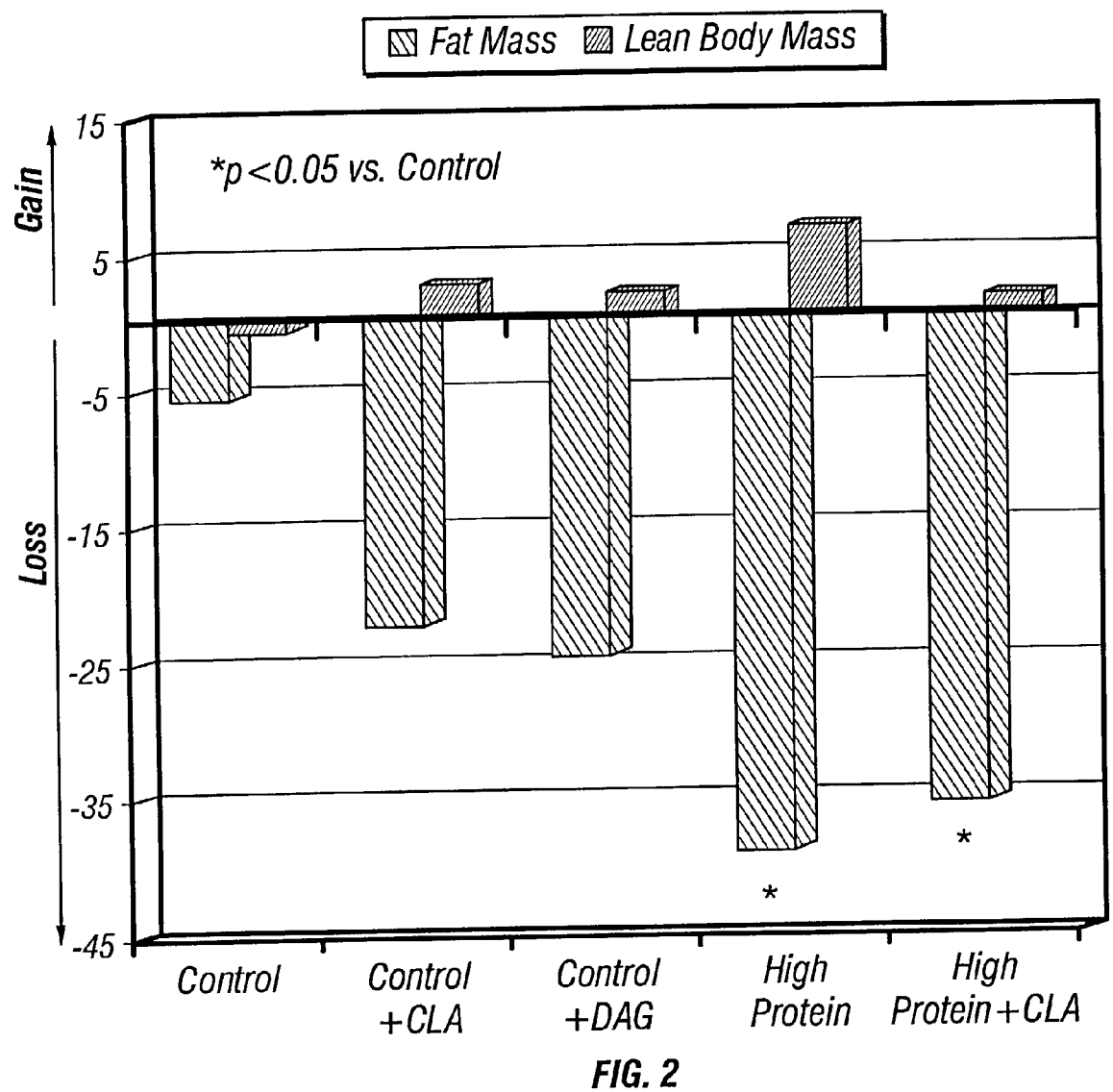
FIG. 2 is a chart illustrating the percent change in lean body and fat mass over time.

The observed weight loss of the dogs on all five diets is due to a significant loss of fat mass (FIG. 2) while sparing lean body (i.e., muscle) mass. The dogs on the following diets experienced an increase in lean body mass: Control+Conjugated Linoleic Acid (CLA), Control+diacylglycerides (DAG), High protein (50% protein), and (5) High protein+ CLA. In contrast, the dogs on the Control diet demonstrated a slight decrease in lean body mass. Interestingly, the effect of DAG alone on fat mass and lean body mass indicates its importance as a functional ingredient in a weight management system. Comparing the two high protein diets demonstrates that the effect of consuming high protein is stronger than the effect observed with CLA alone on both fat and lean body mass. From these results, it is clear that a comprehensive weight management system including high protein and a functional ingredient of conjugated fatty acids or 1,3-diacylglycerides is effective in promoting an increase in lean body mass and a decrease in fat mass.

Figure 3:
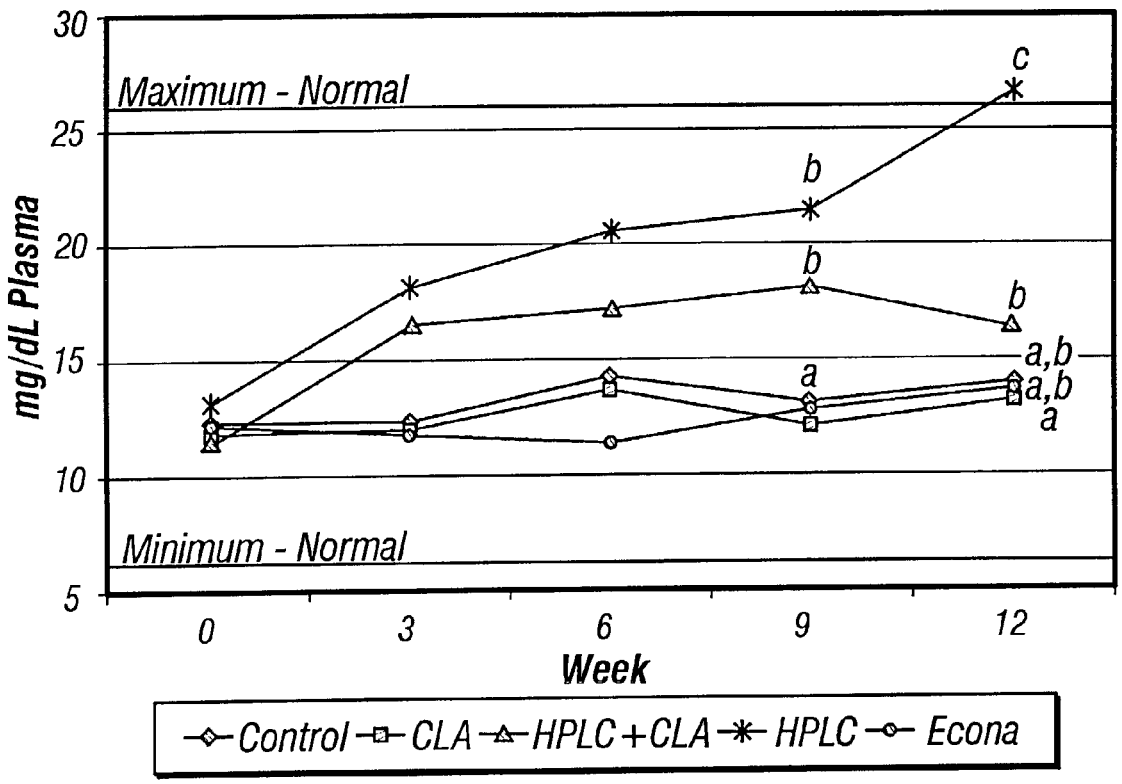
FIG. 3 is a chart illustrating the blood urea nitrogen (BUN) levels of dogs consuming the inventive diets or control diets over time.
Figure 4:
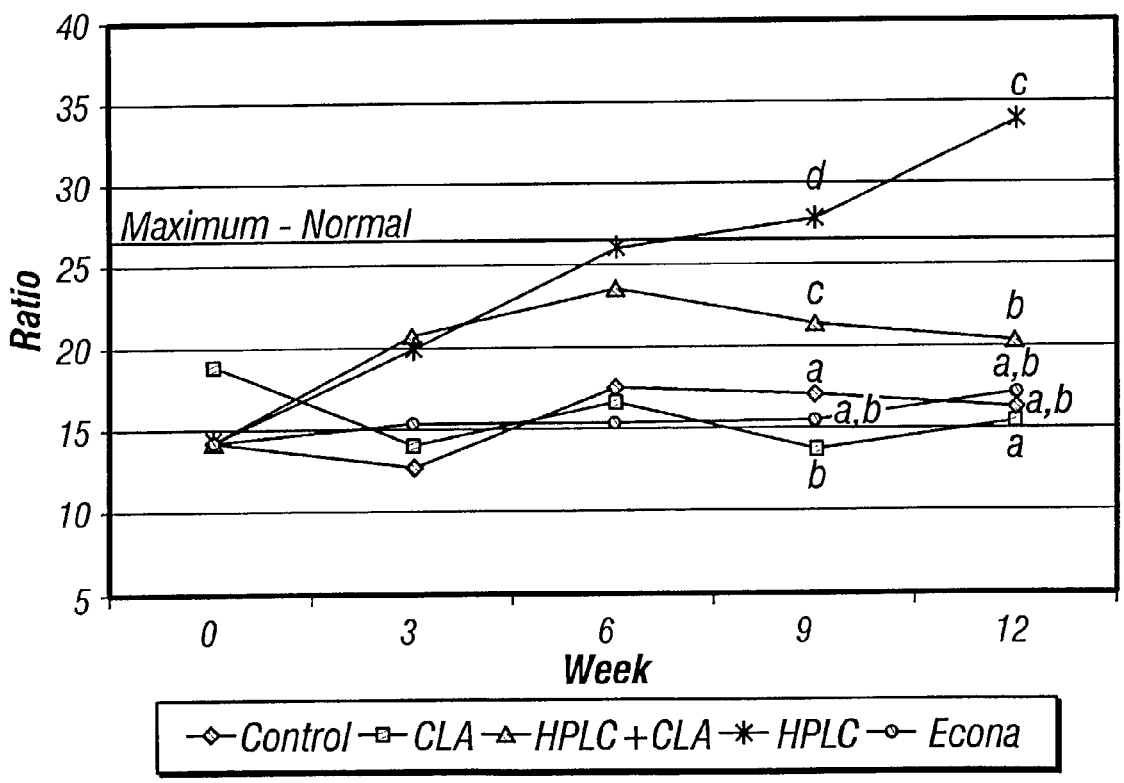
FIG. 4 is a chart illustrating the blood urea nitrogen (BUN)/creatinine ratio levels in dogs consuming the inventive diets or control diets over time.

BUN levels are a direct measure of protein consumption. Dogs fed the HPLC (high protein, low carbohydrate) diet expectedly demonstrated increased BUN levels (FIG. 3) and increased BUN/creatinine ratio levels (FIG. 4). However, the high protein diets comprising conjugated linoleic acid (HPLC+CLA) or a 1,3-diacyglyceride (Econa) maintained normal BUN levels as compared to the Control dieter levels over the 12 week test period. The designations "a", "b" and "c" indicate significant differences between the designated groups ($p>0.05$) at the time the blood was taken. Each diet afforded normal BUN levels, with or without the correction for creatinine, for the first half of the testing period. After 6 weeks, dogs fed the HPLC diet demonstrated above normal and significantly different BUN/creatinine ratio levels (FIG. 4) as compared to the CLA, HPLC+CLA and Econa dieters. Similarly, direct measurement of BUN levels yielded above normal and statistically different levels as compared to the CLA, HPLC+CLA and Econa fed dogs (FIG. 3).

This unexpected effect of the inventive diets on protein metabolism indicates that potential medical risks associated with high protein diets are neutralized by co-consumption of the functional ingredients. The reduced risks of renal (e.g. kidney) damage and failure by consumption of the inventive diets is a substantial metabolic improvement in efforts to prevent and treat obese animals.

After a desired weight loss has been achieved, it is important to maintain the weight loss. To this end, the dog is fed a low calorie diet comprising a lower protein content than the weight loss diet. For example, the caloric density of the weight loss diet and the weight maintenance diet are between about 300 to about 330 kcal/100 g. However, the protein content of the weight maintenance diet is about 10% to about 45% less than the protein content of the weight loss diet. Further, both dietary food products comprise a functional ingredient, which is helps maintain the weight loss experienced in the first phase of the comprehensive weight management system. The dog that is fed the weight maintenance diet demonstrates long-lasting weight management and a healthier life as compared to a dog that is fed a normal diet.

A common misconception in treating and preventing obesity in companion animals is that a drastic reduction in food intake is required. When this occurs, the animals often scavenge and beg for food because of the constant hunger sensation. As a result of hunger sensations, the animal finds additional food or pet owners feed the animal in order to stop the begging, with the result of no weight reduction. In prior art methods, for weight reduction to occur, the animal's food intake must be decreased for a sustained and regular period of time and the animal must be inhibited from constant scavenging and begging, which increases the food intake. Most pet owners fail in the treatment and prevention of obesity in their pets because they are unable to keep the animal's food intake at a decreased level for extended periods of time, and they are unable to prevent their animals from scavenging and begging. Moreover, even if weight loss is achieved, there are few, if any, options available for maintaining the weight loss and/or leaner body mass.

The novel weight management system provides a comprehensive approach to help optimize the body composition of a domestic animal through dietary intervention without the side effects associated with prior diets. The present invention targets (i) an induction in adipose (fat) metabolism, (ii) an increase in satiety and maintenance of palatability to reduce behavioral changes (i.e., begging) which lead to increased caloric consumption, (iii) a minimization of muscle wasting that can occur from low protein, calorie-restricted diets and (iv) maintaining these factors for the life of the animal. This weight management system reduces the total energy delivery, induces an increase in fat metabolism, and thus, leaves the pet satiated. Further, this weight management system mitigates potential adverse effects associated with consumption of high protein diets (i.e., ketosis).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

REFERENCES

The following references, to the extent that they provide exemplary procedural or other details supplementary to those set forth herein, are specifically incorporated herein by reference:

U.S. Pat. No. 3,830,931 issued Aug. 20, 1974.
U.S. Pat. No. 3,968,241 issued Jul. 6, 1976.
U.S. Pat. No. 3,810,994 issued May 14, 1974.
U.S. Pat. No. 6,071,544 issued Jun. 6, 2000.
U.S. Pat. No. 6,204,291 issued Mar. 20, 2001.
U.S. Pat. No. 3,810,994 issued May 14, 1974.
U.S. Pat. No. 4,255,449 issued Mar. 10, 1981.
U.S. Pat. No. 4,737,364 issued Apr. 12, 1988.
U.S. Pat. No. 5,141,755 issued Aug. 25, 1992.
U.S. Pat. No. 5,554,646, issued Sep. 10, 1996
U.S. Pat. No. 5,760,082, issued Jun. 2, 1998
U.S. Pat. No. 5,855,917, issued Jan. 5, 1999
U.S. Pat. No. 6,015,833, issued Jan. 18, 2000
U.S. Pat. No. 6,020,378, issued Feb. 1, 2000
U.S. Pat. No. 6,060,514, issued May 9, 2000
U.S. Pat. No. 6,214,372, issued Apr. 10, 2001
U.S. Pat. No. 6,225,486, issued May 1, 2001
U.S. Pat. No. 6,242,621, issued Jun. 5, 2001
U.S. Pat. No. 6,333,353, issued Dec. 25, 2001
U.S. Pat. No. 6,380,409, issued Apr. 30, 2002
U.S. Pat. No. 6,410,761, issued Jun. 25, 2002
WO 00/51443, publication date Sep. 8, 2000.
EP 965278A1, publication date Dec. 12, 1999.
Appleton, D. J., Rand, J. S., Sunvold, G. D. "Feline obesity: pathogenesis and implications for the risk of diabetes" in Recent Advances in Canine and Feline Nutrition. Vol. III: 2000 IAMS Nutrition Symposium Proceedings. pp. 81-90.
Nobels, F, van Gaal, L., de Leeuw, I. *Netherlands Journal of Medicine,* 35: 295-302 (1989).
Yalkowsky, S. H., *Pharmaceutical Society,* 59(6), 798 (1970).
Sunvold, G. D. "The role of novel nutrients in managing obesity" in Recent Advances in Canine and Feline Nutrition. Vol. III: 2000 IAMS Nutrition Symposium Proceedings. pp. 123-133.
Bouchard, G. F., Sunvold, G. D. "Effect of dietary carbohydrate source on postprandial plasma glucose and insulin concentration in cats" in Recent Advances in Canine and Feline Nutrition. Vol. III: 2000 IAMS Nutrition Symposium Proceedings. pp. 91-101.
Hara, K. et al. "Dietary Diacylglycerol-Dependent Reduction in Serum Triacylglycerol Concentration in Rats" *Ann. Nutr. Metab.,* 37, 185-191 (1993).
Watanabe H., et al. Nutritional characteristics of diacylglycerols in rats" *J. Japan Oil Chem. Soc.,* 46, 301-307 (1997).
Nagao, T. et al. "Dietary Diacylglycerol suppresses accumulation of body fat compared to triacylglycerol in men in a double-blind controlled trial" *J. Nutr.,* 130, 792-797 (2000).

We claim:

1. A diet for promoting comprehensive weight management in companion animals comprising a first stage pet food product for promoting weight loss and a second stage pet food product for maintaining the weight loss, said first stage pet food product comprising, on a dry matter basis, about 35% to about 70% by weight of a protein, about 4% to about 10% by weight of a fat, about 2% to about 25% by weight of a fiber, about 10% to about 35% by weight of a carbohydrate, and about 0.1% to about 2% by weight of a functional ingredient, wherein said functional ingredient is selected from the group consisting of L-carnitine and conjugated linoleic acid; and said second stage pet food product comprising, on a dry matter basis, about 20% to about 35% by weight of a protein, about 4% to about 10% by weight of a fat, about 2% to about 25% by weight of a fiber, about 25% to about 70% by weight of a carbohydrate, and about 0.1% to about 2% by weight of a functional ingredient, wherein said functional ingredient is selected from the group consisting of L-carnitine and conjugated linoleic acid, wherein the protein content of the second stage pet food product is about 10% to about 45% less than the protein content of the first stage pet food product.

2. The pet food product of claim 1, wherein said companion animal is selected from the group consisting of a dog and a cat.

3. The pet food product of claim 1, wherein said fat comprises an essential long-chain fatty acid.

4. The pet food product of claim 1, wherein said functional ingredient is conjugated linoleic acid.

5. The pet food product of claim 1, wherein a comprehensive weight management includes a change in physiology of a companion animal selected from a group consisting of an increase in lean body mass, weight loss, an increase in the animal's satiety, a decrease in the animal's voluntary food intake, a decrease in a BUN level, a decrease in a BUN/creatinine ratio level, and a reduction in the risk of ketosis to the animal.

6. The pet food product of claim 1, wherein the pet food product is selected from a group consisting of a wet pet food, a semi-moist pet food, a dry pet food, a pet treat, a pet snack, and a pet drink.

7. A process of promoting comprehensive weight management in companion animals comprising the steps of:
feeding to said animal for a time sufficient to promote weight loss in the animal, a first diet comprising, on a dry matter basis, about 35% to about 70% by weight of a protein, about 4% to about 10% by weight of a fat, about 2% to about 25% by weight of a fiber, about 10% to about 35% by weight of a carbohydrate, and about 0.1% to about 2% by weight of a functional ingredient, wherein said functional ingredient is selected from the group consisting of L-carnitine and conjugated linoleic acid; and
feeding to said animal a second diet to maintain the weight loss comprising, on a dry matter basis, about 20% to about 35% by weight of a protein, about 4% to about 10% by weight of a fat, about 2% to about 25% by weight of a fiber, about 25% to about 70% by weight of a carbohydrate, and about 0.1% to about 2% by weight of a functional ingredient, wherein said functional ingredient is selected from the group consisting of L-carnitine and conjugated linoleic acid; and
measuring a change in physiology of the companion animal, wherein the change in physiology provides an indicator of comprehensive weight management,
wherein the protein content of the second diet is about 10% to about 45% less than the protein content of the first diet.

8. The process of claim 7, wherein said animal is selected from the group consisting of a dog and a cat.

9. The process of claim 7, wherein said fat comprises essential long-chain fatty acids.

10. The process of claim 7, wherein said functional ingredient is conjugated linoleic acid.

11. The process of claim 7, wherein the pet food product is selected from a group consisting of a wet pet food, a semi-moist pet food, a dry pet food, a pet treat, a pet snack, and a pet drink.

12. The process of claim 7, wherein the measuring step comprises measuring lean body mass, weight loss, satiety, food intake, BUN level, BUN/creatinine ratio level or ketone levels.

13. The process of claim 7, wherein a change in physiology of a companion animal is selected from a group consisting of an increase in lean body mass, an increase in weight loss, an increase in the animal's satiety, a decrease in the animal's voluntary food intake, a decrease in a BUN level, a decrease in a BUN/creatinine ratio level, and a reduction in the risk of ketosis to the animal.

* * * * *